United States Patent [19]

Fraser et al.

[11] Patent Number: 4,781,930
[45] Date of Patent: Nov. 1, 1988

[54] METHOD OF PREPARING A FISH PRODUCT

[75] Inventors: Alfred T. Fraser, Medway; Paul J. Fraser, Millis, both of Mass.

[73] Assignee: Fraser Fish Ltd., Boston, Mass.

[21] Appl. No.: 868,566

[22] Filed: May 30, 1986

[51] Int. Cl.⁴ .................... A23L 1/176; A23B 4/10
[52] U.S. Cl. ........................................ 426/96; 426/99; 426/100; 426/293; 426/302; 426/307; 426/310; 426/524
[58] Field of Search ............... 426/92, 95, 293, 302, 426/303, 307, 310, 99, 100, 643, 96, 524

[56] References Cited

U.S. PATENT DOCUMENTS 3,078,172  2/1963  Libby .................... 426/293 X
4,199,603  4/1980  Sortwell ................. 426/293 X

FOREIGN PATENT DOCUMENTS 58-40081  3/1983  Japan .................... 426/92

Primary Examiner—Donald E. Czaja
Assistant Examiner—Celine T. Callahan
Attorney, Agent, or Firm—Robert T. Gammons

[57] ABSTRACT

A fish product comprising a fillet of fish coated with an edible oil sufficiently to provide surface penetration to the extent to prevent excretion of the juices and exclusion of air and further coated with an adhering layer of crumbs such as bread or cracker crumbs. The thus treated fillet can be cooked immediately for consumption or deep frozen for future use.

1 Claim, No Drawings

METHOD OF PREPARING A FISH PRODUCT

BACKGROUND OF THE INVENTION

Fish products in the form of crumb-coated fillets are disclosed in U.S. Pat. Nos. 2,716,608 and 3,718,481. The products therein disclosed are not totally satisfactory because the coating of crackers or bread crumbs draws out the natural juices of the fish, dehydrating the fish so that it becomes dry and, hence, unpalatable and renders the cracker or bread crumbs soggy and unsightly. When cooked, the moisture drained out by the crumbs is immediately dissipated, leaving the fillet dry and tasteless. It is the purpose of this invention to prepare the fillet in such a way that the natural flavors will be retained prior to and during cooking to thus preserve the natural flavor of the fish and its natural flaky tenderness.

SUMMARY OF THE INVENTION

As herein illustrated, the invention comprises a fish product in the form of a fish fillet to which a coating of edible oil is applied in sufficient quantity to effect surface penetration to a degree to inhibit excretion of natural fluids from the fillet and surface-coated with crumbs such as cracker crumbs or bread crumbs. The fillet as thus prepared can be immediately cooked or subjected to deep freezing for future cooking. Optionally, the fillet may be frozen prior to coating the oil and crumbs and, when ready for use, coating with oil and crumbs while still frozen or thawed and coated with oil and crumbs.

In accordance with the invention as will now be described, the fillet may be comprised of any of the common edible fish, edible oil derived from vegetables or animal fat and crumbs as, for example, cracker crumbs or bread crumbs. The product as thus treated is ready for cooking or for freezing.

There are large quantities of fish available for the taking which never reach the market because they are not recognized and/or are not durable enough to survive normal retailing in that deterioration commences within a short time with loss of flavor, color and texture, making it unacceptable to the purchaser. Thus, a large source of income to the fisherman is lost and a large source of truly excellent fish is not available to the purchasing public. Fish, for example, flounder, haddock, schrod, hake, pollock, cusk, cod and white fish are plentiful and perfectly good from a nutritional standpoint. Treated according to this invention, such fish provides a source affording not only a nutritional food, but an attractive food to the gourmet. For treating the fish according to the invention, the oil used can be, for example, vegetable oil, soybean oil, cottonseed oil, cornseed oil or any sublimated animal oil. For the crumbs, cracker crumbs such as Ritz crackers, bread crumbs or Pepperidge Farm Herb Seasoned Stuffing.

The fish product is prepared by filleting the selected fish to appropriate thickness and with minimal delay from exposure, placing it in or applying to its surface a plethora of selected oil so that the freshly filleted fish will absorb or adsorb the oil to an appropriate depth to thus inhibit excretion of the natural fluids from the fillet. The film of oil not only prevents excretion of the natural fluids, and hence, drying out, but also prevents incursion of air and moisture which, unabated, would cause the fish to become mushy and promote deterioration. The oil has the favorable advantage that it also effects an even distribution of heat during cooking and enhances the flavor of the crumbs, rendering them crisp and flavorful and preserves the temperature at a uniform level throughout the period of cooking. In order to achieve the desired penetration, the fillet must be exposed to the oil immediately following filleting and allowed to remain exposed for a period of 5 to 10 minutes, desirably at room temperature. After such exposure, the fillet should be drained of excess surface oil and dipped in, or sprinkled with, the selected crumbs. The oil crumbed product is now ready for immediate use or for refrigeration. Optionally, the fillet can be frozen by deep freezing techniques commonly used for preserving fish and meats prior to use and the oil and crumbs applied when ready for use either to the frozen fish or to the fish after it has been thawed out. In either instance, the coating of oil preserves the moisture, enhances the application of crumbs and contributes to reaching a cooking temperature quickly. The coating of oil enables reaching cooking temperatures in a microwave oven within approximately 7 minutes.

To prepare the fish product for consumption, it is desirable to garnish it with vegetables, cheese and other seafood products such as crabmeat, scallops and the like. The vegetables must be precooked, dried and cooled prior to application to the fish. Following garnishing, the frozen or thawed fish can be oven-baked or subjected to cooking at approximately 350° for 15 to 20 minutes. If the fillet is frozen, it should be cooked at 400° to 425° for 20 to 30 minutes. To cook the fish in a microwave oven, frozen or unfrozen, takes approximately 7 minutes.

A typical example of garnishing is to apply to the fillet a layer of cooked and cooled spinach, sauteed mushrooms and a layer of shredded cheese. Shredded crabmeat or diced scallops may be added according to the whim of the cook.

An essential feature of the invention is to so prepare the fillet that when ready for garnishing and cooking, it is preserved in its original freshness without loss of natural juices and without approach of deterioration and, by such treatment, to enable an extensive use of fish which is not generally available either because of lack of a suitable way of preserving it for use or because it is not known by the purchasing public.

It should be understood that the present disclosure is for the purpose of illustration only and includes all modifications or improvements which fall within the scope of the appended claims.

What is claimed is:

1. A method of preparing a fish product comprising filleting a fish to appropriate thickness, immediately immersing the filleted fish in a vegetable oil for a period of 5 to 10 minutes at room temperature to effect absorption of the oil to a depth such as to inhibit excretion of the natural fluids from the fillet and prevent incursion of air and moisture, draining the excess oil from the surface, covering the surface with crumbs and then freezing the fillet.

* * * * *